Feb. 21, 1961  D. R. McCARTY  2,972,435
APPARATUS FOR COLORING PAINT
Filed May 8, 1958  2 Sheets-Sheet 1
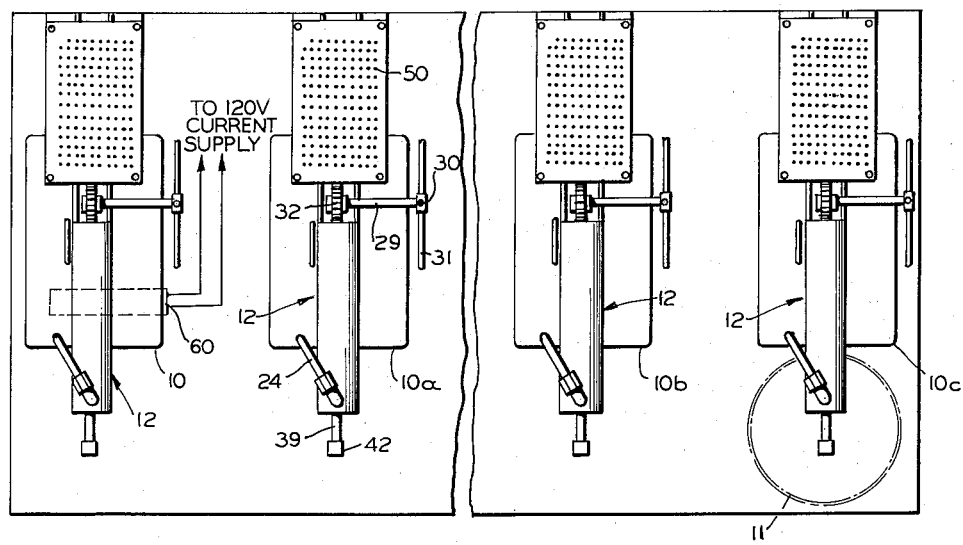
FIG_1
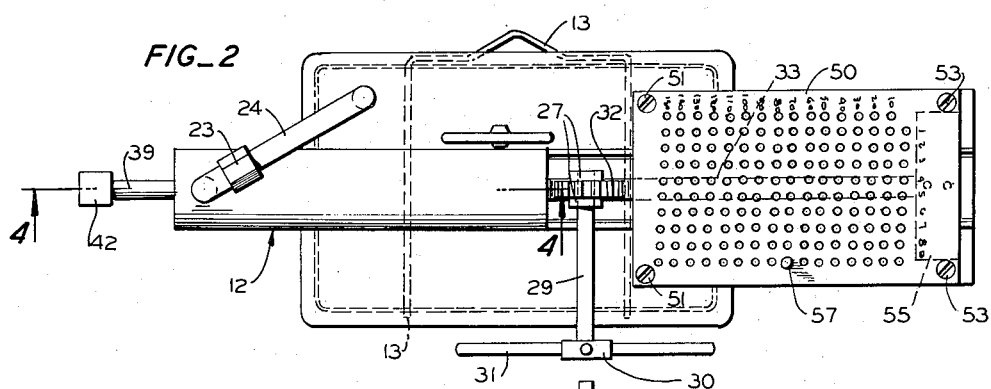
FIG_2
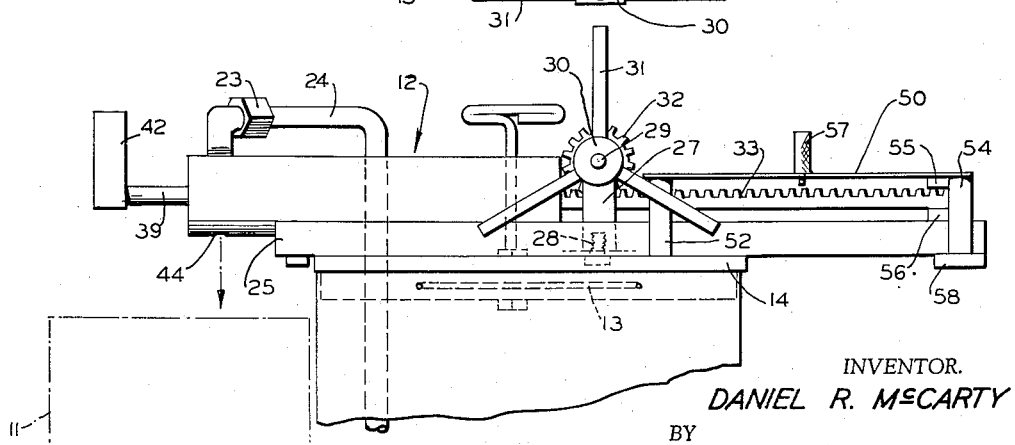
FIG_3
INVENTOR.
DANIEL R. McCARTY
BY
ATTORNEYS Feb. 21, 1961     D. R. McCARTY     2,972,435
APPARATUS FOR COLORING PAINT
Filed May 8, 1958                                                     2 Sheets-Sheet 2
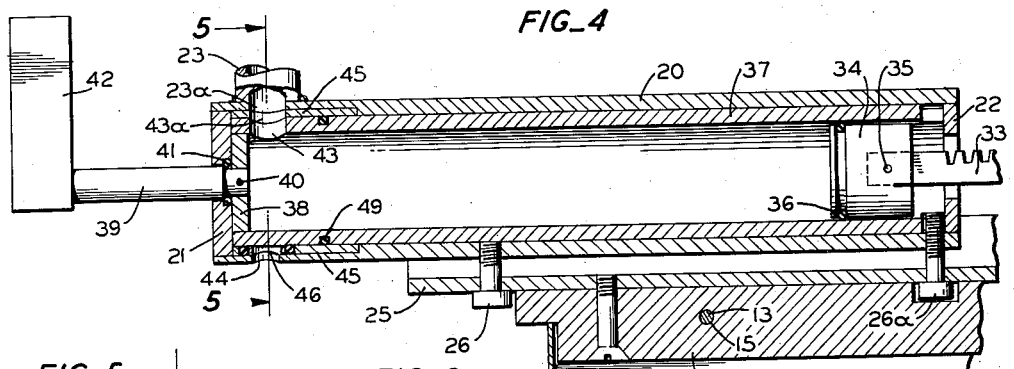
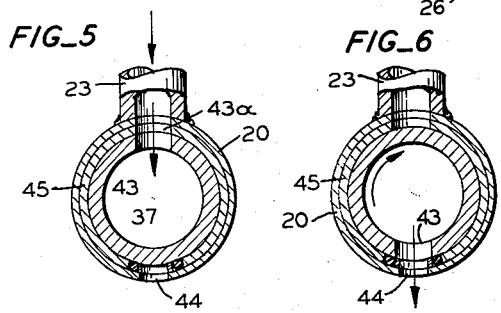
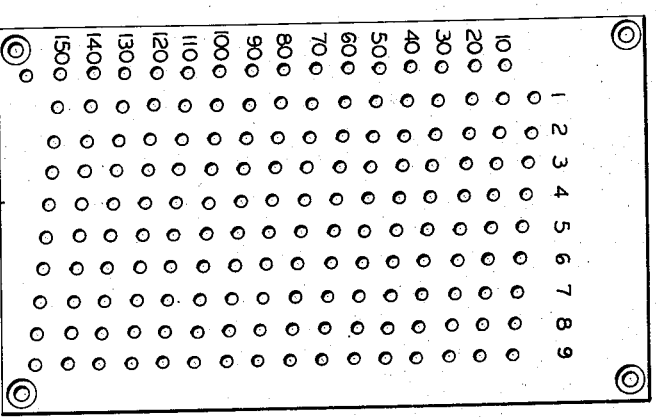
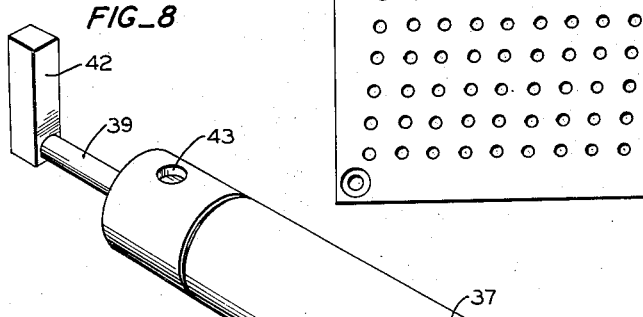
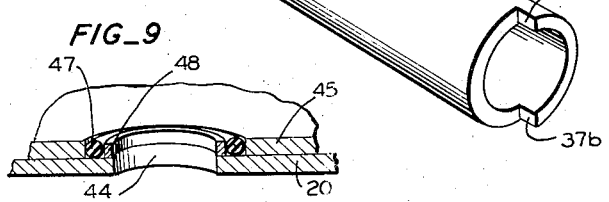
INVENTOR.
DANIEL R. McCARTY
BY
ATTORNEYS

United States Patent Office

2,972,435
Patented Feb. 21, 1961

2,972,435

APPARATUS FOR COLORING PAINT

Daniel R. McCarty, Santa Cruz, Calif., assignor to Universal Color Corporation, Oakland, Calif., a corporation of California Filed May 8, 1958, Ser. No. 733,888

4 Claims. (Cl. 222—309)

This invention relates to a method and apparatus for compounding paint in general. More specifically this invention relates to a method and apparatus for selecting and measuring paint, coloring or tinting materials to be mixed with definite quantities of base paint.

An object of this invention is to provide a method of compounding paints of different colors in which different coloring agents may be accurately measured at different stations in accordance with predetermined data and provided to a base paint to compound a paint of any one of a series of predetermined colors.

Another object of this invention is to provide an improved apparatus for accurate volumetric measuring and dispensing coloring agents to be mixed with a base paint to provide any one of a series of predetermined color paints.

Still another object of this invention is to provide an improved apparatus for accurately measuring and dispensing paint colors, said apparatus being capable of accurately measuring and dispensing as little as three drops of the coloring agent.

Another object of this invention is to provide an apparatus for dispensing paint colorants, said apparatus being adapted to dispense $1/160$ part of an ounce or any multiple thereof.

Still another object of this invention is to provide an improved apparatus of simple design and relatively inexpensive nature that is easy to operate and that accurately measures the volume of tinting or coloring agents to be used in compounding paints of different colors.

Other and further objects of this invention will be apparent to those skilled in the art to which it relates from the following specification, claims and drawing.

In accordance with this invention there is provided a method and apparatus for accurately measuring the volume of tinting or coloring liquids whereby a paint dealer may employ this invention to compound paints of any one of a multiplicity of different colors without having to use coloring agents that are packaged in small tubes, jars and the like with which accurate tinting is difficult. By stocking a quantity of white base paint material and a series of coloring agents that may be accurately measured volumetrically and dispensed into a predetermined quantity or quantities of the base paint the dealer may produce any one of a large number of paints of different colors without keeping a large inventory of different color paints in ready mixed condition.

This invention employs a device that may be mounted in the top of a can of paint coloring material which may be withdrawn and accurately measured from the container as needed. A series of containers of coloring material each provided with one of these measuring devices is employed together with a chart on which is tabulated the amount of the coloring material required for a pint, quart, half gallon or gallon is tabulated. This device comprises a cylinder and piston arrangement which is filled with the coloring material and which is provided with an adjustable arrangement to control the dispensing of paint coloring material therefrom in an accurate manner. Each container of coloring material is provided with one of these devices and each device is manually adjusted in accordance with the aforesaid chart so that a person compounding paints of different colors may adjust the different devices whereby the desired coloring materials are accurately dispensed to provide different quantities of the desired color paint.

Further details and features of this invention will be apparent to those skilled in the art to which it relates from the following specification, claims and drawing in which briefly:

Figure 1 is a schematic diagram showing a plurality of paint coloring stations provided in accordance with this invention;

Figure 2 is a plan view of one of the volumetric measuring devices attached to a container;

Figure 3 is a side view of the device shown in Figure 2;

Figure 4 is a sectional view taken along the line 4—4 of Figure 2;

Figure 5 is a sectional view taken along the line 5—5 of Figure 4 showing the volumetric measuring device with its inlet open to receive fluid colorant;

Figure 6 is a sectional view similar to Figure 5 showing the outlet of the measuring device open;

Figure 7 is a plan view of the perforated control plate employed on this measuring device;

Figure 8 is a perspective view of the internal sleeve employed in this device; and Figure 9 is an enlarged view of the outlet of the measuring device.

In the drawing there is shown an embodiment of this invention employing a plurality of color tinting stations as shown in Figure 1 having the containers 10, 10a, 10b, 10c of tinting or coloring materials suspended in suitable solvents and on each container there is positioned an accurately adjustable dispensing device 12. For example, the container 10 may have red paint tinting material; the container 10a may have blue tinting material; the container 10b may have green tinting material and the container 10c may have yellow tinting material. Variations of these colors may be included and in practice it is preferred to employ 11 of these stations with different paint tinting materials therein so that by using accurately measured amounts of the different tinting materials paints of a wide variety of colors may be compounded when these different tinting materials are employed in accurately measure amounts with a white base paint. The amounts of the different tinting materials to be added to definite quantities of white base paint, for example, a pint, quart, half gallon or a gallon are charted so that by following the information given on the chart a person can compound any desired one of a wide range of colors simply by measuring accurate amounts from the designated ones of the 11 color stations.

The volumetric measuring devices 12 employed at each of the coloring stations are accurately calibrated so that different amounts of coloring matter ranging three drops to one fluid ounce may be provided therewith. For example, in compounding a certain color, the operator may employ three drops of the tinting material from container 10 plus a half ounce of the coloring material from container 10a and nine drops of coloring material from the container 10c. These quantities are measured by the measuring devices associated with each of these containers and they are placed into the container 11 which has a definite quantity of white base paint. The measuring devices are mounted on boards 14 which are of a size such as to fit the top of the color container and these boards are provided with holes 15 formed therethrough in alignment with corresponding holes formed in the top of the color container so that a U-shaped wire 13 may be inserted therein and the cover held fast on the container by said wire.

Since all of the measuring devices 12 are of identical construction, only one of these devices will be illustrated and described in detail. These devices are provided with an outer cylinder 20 as shown in Figure 4, which is preferably made of brass, or similar alloys although it may of course be made of other materials that are not soluble by paint solvents and one such insoluble material is a resin sold under the name of "Bakelite." The cylinder 20 is provided with end walls 21 and 22 and it is also provided with an inlet opening 23a positioned on the top thereof near the end wall 21. The fitting 23 is attached to the cylinder 20 so that the outlet of this fitting is in communication with the inlet 23a. An intake pipe 24 which may be made of copper or suitable plastic material is attached to the fitting 23 and extends into the container 10 so that the inlet of this intake pipe is near the bottom of the container. The intake pipe 24 may be made of translucent plastic material so that the color of the tinting material fed therethrough from the container into the measuring device may be observed.

The outer cylinder 20 is attached to the channel iron member 25 by means of bolts 26 and 26a which are threaded into the outer cylinder and the bolt 26a which engages the cylinder near the end thereof adjacent to the end wall 22, extends a short distance into the cylinder to act as a stop as will be described hereinafter. An upright member 27 shown in Figures 2 and 3, is also supported on the channel member 25 and the bolt 28 is provided for fastening these members together. The upper end of the upright member 27 is bifurcated for receiving the pinion 32 which is mounted on the shaft 29 that is journaled in the bifurcated portion. A hub 30 that is provided with hand actuating arms 31 is attached to the outer end of the shaft 29 so that this shaft and the pinion 32 may be manually rotated.

The pinion 32 meshes with the rack 33 that extends into the cylinder 20 through the hole formed in the end wall 22 and the rack is attached to the piston 34 by means of the pin 35 as shown in Figure 4. The piston 34 is positioned in the inner sleeve 37 that is fitted into the outer cylinder 20 and an O-ring 36 is provided for this piston to form a seal between it and the sleeve 37.

The sleeve 37 is provided with an end wall 38 adjacent to the end wall 21 of the outer cylinder. A shaft extends into the end wall 38 and is attached thereto by means of a pin 40 so that when the shaft 39 is rotated by the hand lever 42 the sleeve 37 is also rotated inside of the outer cylinder 20. Rotation of the sleeve 37 is limited to a half revolution by the stops 37a and 37b that are provided to the sleeve as shown in Figure 8, and which are adapted to be engaged by the screw 26a. A suitable O-ring 41 is positioned in a recess formed in the end wall 21 so that this O-ring forms a seal around the shaft 39. The sleeve 37 is provided with an opening 43 which may be brought into alignment with the opening 23a in the outer cylinder 20 and with the opening 43a in the short sleeve 45 as shown in Figure 5. The sleeve 37 may be rotated by means of the handle 42 to its intake position and it assumes this position when the handle 42 is upright. When the sleeve 37 is in this intake position, it may be filled with paint coloring material by working the piston 34 back and forth a few times by means of the manually rotatable pinion 32 which engages the rack 33 that is attached to the piston 34 and when it is desired to have the sleeve 37 full of paint coloring material, the piston 34 is of course left in its position at the right hand end of the sleeve as shown in Figure 4.

When it is desired to expel a certain volume of paint coloring material out of the sleeve 37 into a container of base paint, this sleeve is first rotated by means of the handle 42 so that the opening 43 is in alignment with the outlet opening 44 of the outer sleeve 20 and with the opening 46 in the short sleeve 45 as shown in Figure 6. This position is assumed by the sleeve 37 when the handle 42 points downward and when the stop 37a formed at the other end of the sleeve 37 abuts the inner end of the screw 26a.

An O-ring 47 is provided in the opening 46 of the short sleeve 45 to prevent the possibility of air being drawn into the sleeve 37 when this sleeve is in its intake position, that is when the hole 43 is aligned with the intake hole 23a of the cylinder 20. A metallic ring 48 is provided inside of the O-ring 47 so that the shape of this O-ring is retained when the sleeve 37 is rotated even though the sleeve 37 is in frictional contact with this O-ring. Another O-ring 49 is provided around the rotatable sleeve 37 and a suitable recess is formed in this sleeve for receiving this O-ring which is in frictional contact with the short sleeve 45 and prevents liquid coloring material from entering between the sleeve 37 and the cylinder 20.

All of the O-rings 36, 41, 47 and 49 are made of material such as neoprene, "Teflon," "Thiokol" or similar resilient and slightly elastic materials that are insoluble in the solvents employed for the colors. By employing these O-rings and by machining the movable parts to close tolerances, substantially air tight connections between these parts is obtained so that the piston 34 may provide the desired suction and pressure when it is operated in the sleeve 37.

The perforated control panel 50 shown in Figure 7 is mounted by means of suitable screws 51 and 53 on short upright members 52 and 54, respectively, as shown in Figures 2 and 3. The upright members 54 are supported on a cross piece 58 that is attached to one end of the channel iron member 25. A similar cross piece (not shown) is employed for supporting the upright pieces 52 on the channel iron member 25. In this way the control panel 50 is held in fixed relation with respect to the channel iron member 25 and also with respect to the cylinder 20 and sleeve 37 of the measuring device.

The control panel 50 is provided with 160 stop holes that are arranged in rows as shown in Figure 7. These rows of holes are slightly tilted so that the number 9 hole of the first row is displaced longitudinally with respect to the No. 10 hole of the second row by the same distance as the No. 8 hole of the first row is displaced from the No. 9 hole of this same row. Thus all of the holes are longitudinally displaced with respect to the immediately preceding hole by the same distance. This same longitudinal displacement is maintained throughout and enables the operator of this device to divide the ounce of coloring material in the sleeve 37 into any multiple of 160 since there are 160 holes in the panel. These holes are of a size such that they each snugly receive the bottom end of the pin 57 which when placed in any hole, projects a small distance below the bottom of the panel as shown in Figure 3. In this way, this bottom end portion of the pin 57 engages the cross piece 55 that is attached to the outer end of the rack 33 when this rack and the piston 34 are moved in the sleeve 37 to the left. By positioning the pin 57 in the No. 1 hole, motion of the rack and piston is controlled so that only three drops or $\frac{1}{160}$ part of an ounce of coloring material is expelled from the measuring device through the outlet 44 when the control handle 42 is in its downward position. The holes on the panel 50 are staggered by just the right amount so that as the pin 57 is moved from one hole to the next, the piston is permitted to be moved an additional distance to expell an additional $\frac{1}{160}$ ounce of coloring material. Accordingly, as the pin is moved along the panel to the No. 160 hole, one ounce of coloring material is expelled from the sleeve. Of course the sleeve 37 may be made of different sizes so that more or less than one liquid ounce of material may be stored therein if desired.

It is desired to keep the liquid colors in the containers 10, 10a, 10b and 10c always of a fairly uniform fluid consistency and in cold climates, each of these containers 10, 10a, 10b and 10c may be provided with an electric heater 60 of the emersion type which may be plugged into the conventional 120 v. lighting circuit so that a small amount of heat is generated by the electric current in these emersion heaters for maintaining the colorants of the desired fluidity even in cold climates.

In the operation of this device the handle 42 is first placed in its upper position as shown in Figure 4 and the piston 34 is moved backwards and forwards through its complete stroke two or three times so that any air in the sleeve 37 is replaced by liquid colorant. This is only necessary to first load or prime the measuring device and when it is thus primed the piston is left in its position at the right hand end of the sleeve 37 so that the sleeve is full of fluid colorant of fixed volume. Where this device is employed, as for example, in a paint store, this operation, if performed at the beginning of each day, prohibits any material from settling in the chamber of the sleeve 37 and in this way would prevent the user from expelling any higher pigment percentage because of settling. The inner cylinder or sleeve 37 is then rotated by the handle 42 so that the port 43 thereof is aligned with the outlet of the outer cylinder 20 when it is desired to expel colorant from the device into a suitable container of base paint. After the colorant is added to the base paint it is properly agitated to insure thorough mixing.

While I have shown a preferred embodiment of the invention it will be understood that the invention is capable of variation and modification from the form shown so that its scope should be limited only by the scope of the claims appended hereto.

What I claim is:

1. In paint compounding where a base paint is to be tinted with one or more different paint colorants, the combination comprising a container for liquid paint colorant, a volumetric measuring device, said device comprising a longitudinally extending cylinder having a pipe connected to one end portion thereof and extending into said container for supplying the liquid colorant to said cylinder, a piston in said cylinder, means for moving said piston to the other end portion of said cylinder for sucking the colorant into said cylinder, said last mentioned means also moving said piston from said other end portion to expel colorant from said cylinder, and means for controlling the movement of said piston from said other end whereby the colorant expelled from said cylinder is always taken from said cylinder full of colorant, said last mentioned means including adjustable means whereby the colorant is expelled in various quantities differing from each other only by a few drops and ranging from a few drops thereof to substantially the whole contents of said cylinder, said last mentioned means comprising a plate with a plurality of rows of pin receiving holes formed therein, said rows of holes extending across said plate at angles such that each of the holes in a row is longitudinally displaced from an adjacent hole by an equal distance and also such that the last hole of one row is longitudinally displaced from the first hole of the next row by the aforesaid same distance, and a pin adapted to be positioned in any one of said holes for limiting the movement of said piston so that the quantity of colorant designated by the hole may be expelled from said cylinder.

2. In paint compounding where a base paint is to be tinted with one or more different paint colorants, the combination comprising a container for liquid paint colorant, a removable cover for said container, a volumetric measuring device mounted on said cover, said device comprising a longitudinally extending cylinder having a pipe connected thereto and extending into said container for supplying liquid colorant to said cylinder, a piston in said cylinder for sucking the colorant into said cylinder and expelling said colorant therefrom, a rack and pinion for moving said piston, manually operable means attached to said pinion, and means for determining the amount of the colorant to be expelled from said cylinder, said means comprising a plate with a plurality of rows of pin receiving holes formed therein, said rows of holes extending across said plate at angles such that each of the holes in a row is longitudinally displaced from an adjacent hole by an equal distance and also such that the last hole of one row is longitudinally displaced from the first hole of the next row by the aforesaid same distance, and a pin adapted to be positioned in any one of said holes for limiting the movement of said rack and said piston so that the quantity of colorant designated by the hole may be expelled from said cylinder said pin receiving holes in said plate being longitudinally displaced in small steps such that different quantities of said colorant differing from each other only by a few drops may be expelled and these quantities may range from a few drops to substantially the whole contents of the cylinder.

3. In paint compounding where a base paint is to be tinted with one or more paint colors, the combination as set forth in claim 1 further comprising a hollow rotatable member positioned in said cylinder, said rotatable member having a hole that is adapted to be aligned with the opening of said pipe whereby liquid paint colorant may be sucked into said cylinder through said hole in said rotatable member, said cylinder having a hole through which the liquid paint colorant is adapted to be expelled when said hole in said rotatable member is aligned with said hole in said cylinder, and an O-ring positioned around said hole in said cylinder to prevent paint colorant from getting between said rotatable member and said cylinder and a non-deformable ring positioned inside of said O-ring snugly engaging the inner surface of said O-ring to keep said O-ring from being deformed out of its circular shape because of its frictional engagement with said rotatable member when said rotatable member is rotated.

4. In paint compounding where a base paint is to be tinted with one or more paint colors, the combination as set forth in claim 2 further comprising a hollow rotatable member positioned in said cylinder, said rotatable member having a hole that is adapted to be aligned with the opening of said pipe whereby liquid paint colorant may be sucked into said cylinder through said hole in said rotatable member, said cylinder having a hole through which the liquid paint colorant is adapted to be expelled when said hole in said rotatable member is aligned with said hole in said cylinder, and an O-ring positioned around said hole in said cylinder to prevent paint colorant from getting between said rotatable member and said cylinder and a non-deformable ring positioned inside of said O-ring snugly engaging the inner surface of said O-ring to keep said O-ring from being deformed out of its circular shape because of its frictional engagement with said rotatable member when said rotatable member is rotated.

References Cited in the file of this patent

UNITED STATES PATENTS

| | | |
|---|---|---|
| 1,512,060 | Schmucker | Oct. 12, 1924 |
| 1,782,704 | Woodruff | Nov. 25, 1930 |
| 2,122,148 | Lawrence | June 28, 1938 |
| 2,339,908 | Brewer et al. | Jan. 25, 1944 |
| 2,554,802 | Waas | May 29, 1951 |
| 2,716,510 | Massmann | Aug. 30, 1955 |
| 2,768,581 | Langemack | Oct. 30, 1956 |
| 2,824,585 | Andres | Feb. 25, 1958 |
| 2,854,170 | Borgardt et al. | Sept. 30, 1958 |